(12) United States Patent
Kamiki et al.

(10) Patent No.: US 10,139,224 B2
(45) Date of Patent: Nov. 27, 2018

(54) MEASURING DEVICE

(71) Applicant: TOPCON Corporation, Tokyo-to (JP)

(72) Inventors: Masaki Kamiki, Tokyo-to (JP); Goro Iwasaki, Tokyo-to (JP); Shinji Yamaguchi, Tokyo-to (JP); Satoshi Yanobe, Tokyo-to (JP); Eiji Takeuchi, Tokyo-to (JP); Yosuke Okudaira, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 182 days.

(21) Appl. No.: 15/296,328

(22) Filed: Oct. 18, 2016

(65) Prior Publication Data

US 2017/0108334 A1 Apr. 20, 2017

(30) Foreign Application Priority Data

Oct. 20, 2015 (JP) ................................. 2015-206028

(51) Int. Cl.
*G01C 9/06* (2006.01)
*G01C 9/20* (2006.01)
*G01C 15/00* (2006.01)

(52) U.S. Cl.
CPC .................. *G01C 9/20* (2013.01); *G01C 9/06* (2013.01); *G01C 15/008* (2013.01); *G01C 2009/066* (2013.01)

(58) Field of Classification Search
CPC ..................................... G01C 9/06; G01C 9/20
(Continued)

(56) References Cited

U.S. PATENT DOCUMENTS

| 4,110,609 A | 8/1978 | Beer |
| 4,484,393 A | 11/1984 | Lafreniere |

(Continued)

FOREIGN PATENT DOCUMENTS

| EP | 1772703 A2 | 4/2007 |
| EP | 2476998 A2 | 7/2012 |

(Continued)

OTHER PUBLICATIONS

European communication dated Feb. 8, 2017 in co-pending European patent application No. 16194802.1.
(Continued)

*Primary Examiner* — G. Bradley Bennett
(74) *Attorney, Agent, or Firm* — Nields, Lemack & Frame, LLC

(57) ABSTRACT

The present invention provides a measuring device, which comprises a leveling unit, a measuring device main body provided on the leveling unit, a control unit, a first tilt angle measuring device for detecting a horizontality with high accuracy, and a second tilt angle measuring device for detecting a tilt angle in a wider range than a range of the first tilt angle measuring device and having a higher responsiveness than a responsiveness of the first tilt angle measuring device, wherein the control unit, the first tilt angle measuring device and the second tilt angle measuring device are provided in the measuring device main body and wherein the control unit drives the leveling unit based on a detection result of the second tilt angle measuring device, performs a rough leveling until a tilt angle detected by the second tilt angle measuring device reaches within a range in which the first tilt angle measuring device is capable of detecting and levels the measuring device main body horizontally based on a detection result of the first tilt angle measuring device.

8 Claims, 10 Drawing Sheets

(58) Field of Classification Search
USPC .................................. 33/285, 377, 366.11
See application file for complete search history.

(56) References Cited

U.S. PATENT DOCUMENTS

| | | | |
|---|---|---|---|
| 5,780,848 A | 7/1998 | Thompson et al. | |
| 2002/0189116 A1 | 12/2002 | Yang et al. | |
| 2007/0169362 A1 | 7/2007 | Perchak et al. | |
| 2008/0172894 A1 | 7/2008 | Chang | |
| 2010/0064534 A1 | 3/2010 | Schumacher et al. | |
| 2010/0195094 A1 | 8/2010 | Glimm | |
| 2011/0131824 A1* | 6/2011 | Yanobe | G01C 15/00 |
| | | | 33/292 |
| 2012/0180564 A1 | 7/2012 | Ohtomo et al. | |
| 2012/0216413 A1 | 8/2012 | Adegawa | |
| 2014/0259712 A1 | 9/2014 | Takahashi et al. | |
| 2015/0092187 A1 | 4/2015 | Yamanoi et al. | |
| 2016/0103001 A1* | 4/2016 | Yanobe | G01D 5/2451 |
| | | | 702/151 |
| 2016/0290800 A1* | 10/2016 | Momiyama | G01C 25/00 |
| 2017/0108333 A1 | 4/2017 | Kamiki et al. | |
| 2017/0160108 A1* | 6/2017 | Yanobe | G01C 3/08 |
| 2017/0309806 A1* | 10/2017 | Kumagai | H01L 41/042 |
| 2018/0137650 A1* | 5/2018 | Yanobe | G01C 11/02 |

FOREIGN PATENT DOCUMENTS

| | | |
|---|---|---|
| JP | 5-38521 U | 5/1993 |
| JP | 2000-266545 A | 9/2000 |
| JP | 2001-221635 A | 8/2001 |
| JP | 2011-149854 A | 8/2011 |

OTHER PUBLICATIONS

European communication dated Mar. 23, 2017 in corresponding European patent application No. 16194797.3.
Notice of allowance dated Jul. 16, 2018 in co-pending U.S. Appl. No. 15/296,317.

* cited by examiner

SECOND EMBODIMENT

| STORAGE TIME[ms] | 2 | 4 | 21 | 42 | 62 |
|---|---|---|---|---|---|
| ERROR RATE[%] | 6 | 7 | 16 | 25 | 29 |

THIRD EMBODIMENT

| STORAGE TIME[ms] | 2 | 4 | 21 | 42 | 62 |
|---|---|---|---|---|---|
| ERROR RATE[%] | 3 | 4 | 14 | 24 | 30 |

CONVENTIONAL TILT SENSOR

| STORAGE TIME[ms] | 30 |
|---|---|
| ERROR RATE[%] | 27 |

MEASURING DEVICE

BACKGROUND OF THE INVENTION

The present invention relates to a measuring device having an automatic leveling function.

In a measuring device which performs a distance measurement and an angle measurement, a measuring device main body needs to be horizontally installed. The measuring device includes a leveling device, and further includes a tilt angle measuring device for detecting a leveling state and a horizontality.

As a tilt angle measuring device, there is a tilt angle measuring device which uses the fact that a free liquid surface maintains a horizontality, and as the tilt angle measuring device which uses the free liquid surface, there is, e.g., a tilt sensor.

As regards the tilt sensor, when a device main body, on which the tilt sensor is provided, tilts, the free liquid surface relatively tilts with respect to the device main body.

By entering of a detection light on the free liquid surface, receiving the detection light as reflected on the free liquid surface and detecting a change of a light receiving position caused by the tilt of the liquid surface, a tilt angle of the liquid surface, i.e., the tilt of the device main body can be detected.

In a case where the free liquid surface is used, a followability or a stability of the free liquid surface with respect to a change in tilt of the tilt angle measuring device is affected by a viscosity of a liquid forming the free liquid surface.

That is to say, when a viscosity of a liquid is lower, a followability gets better, but a stability is decreased and becomes susceptible to a vibration or the like. Contrarily, when the viscosity of the liquid is higher, the followability is lower, and a tilt angle detection takes time, but the stability gets better.

Usually, in a measuring instrument, since a measurement accuracy is important, a tilt sensor with a higher viscosity of a liquid and a higher stability is adopted.

In a case where the viscosity of the liquid is higher, there is a problem that the followability of the liquid is poor and the leveling requires time.

SUMMARY OF THE INVENTION

It is an object of the present invention to provide a measuring device in which a leveling operation of a measuring device is performed efficiently.

To attain the object as described above, a measuring device according to the present invention comprises a leveling unit, a measuring device main body provided on the leveling unit, a control unit, a first tilt angle measuring device for detecting a horizontality with high accuracy, and a second tilt angle measuring device for detecting a tilt angle in a wider range than a range of the first tilt angle measuring device and having a higher responsiveness than a responsiveness of the first tilt angle measuring device, wherein the control unit, the first tilt angle measuring device and the second tilt angle measuring device are provided in the measuring device main body and wherein the control unit drives the leveling unit based on a detection result of the second tilt angle measuring device, performs a rough leveling until a tilt angle detected by the second tilt angle measuring device reaches within a range in which the first tilt angle measuring device is capable of detecting and levels the measuring device main body horizontally based on a detection result of the first tilt angle measuring device.

Further, in the measuring device according to the present invention, the control unit determines whether the measuring device main body is capable of being leveled by the leveling unit based on a detection result of the second tilt angle measuring device at the time of installing the measuring device, and notifies of a change in an installing posture or a change in an installing position in a case where the leveling is impossible.

Further, the measuring device according to the present invention further comprises a direction angle detection unit for detecting a relative rotation angle between the leveling unit and the measuring device main body, wherein the control unit stores a leveling state at the end of the measurement and the relative rotation angle detected by the direction angle detection unit, determines whether the leveling of the measuring device main body is possible by the leveling unit based on a detection result of the second tilt angle measuring device, the leveling state, and the relative rotation angle in a case where the measuring device is reinstalled and notifies of a change in an installing posture or a change in an installing position in a case where the leveling is impossible.

Further, in the measuring device according to the present invention, the first tilt angle measuring device comprises a discoid container in which a liquid forming a free liquid surface is included, a light emitting source for allowing a detection light to enter the free liquid surface, a photodetector for receiving the detection light reflected on the free liquid surface, and is configured to detect a tilt of the free liquid surface based on a detection signal from the photodetector, and wherein the container has a groove formed concentrically with a center of the container on a bottom portion and a central portion formed at the center of the container and upheaved from the groove, and wherein the liquid fills the groove and is stored so that a shallowest portion is formed at the central portion.

Further, in the measuring device according to the present invention, a plurality of flow resistance elements are provided to protrude in the groove at equal intervals, and the flow resistance elements are configured to be immersed in the liquid.

Further, in the measuring device according to the present invention, each of the flow resistance elements has an arc shape and a flat upper surface.

Furthermore, in the measuring device according to the present invention, a ring-like flow control plate for covering the groove is provided above the flow resistance elements, a plurality of cutting-off portions are formed in an inner edge of the flow control plate at equal intervals and the flow control plate is configured to be immersed in the liquid.

According to the present invention, the measuring device comprises a leveling unit, a measuring device main body provided on the leveling unit, a control unit, a first tilt angle measuring device for detecting a horizontality with high accuracy, and a second tilt angle measuring device for detecting a tilt angle in a wider range than a range of the first tilt angle measuring device and having a higher responsiveness than a responsiveness of the first tilt angle measuring device, wherein the control unit, the first tilt angle measuring device and the second tilt angle measuring device are provided in the measuring device main body and wherein the control unit drives the leveling unit based on a detection result of the second tilt angle measuring device, performs a rough leveling until a tilt angle detected by the second tilt angle measuring device reaches within a range in which the first tilt angle measuring device is capable of detecting and levels the measuring device main body horizontally based on a detection result of the first tilt angle measuring device. As a result, the leveling can be rapidly performed within a detection range of the first tilt angle measuring device from a tilt state exceeding the detection range of the first tilt angle measuring device, and further the leveling can be horizontally performed with an accuracy of the first tilt angle measuring device, and the rapid and highly accurate leveling can be performed.

Further, according to the present invention, in the measuring device, the control unit determines whether the measuring device main body is capable of being leveled by the leveling unit based on a detection result of the second tilt angle measuring device at the time of installing the measuring device, and notifies of a change in an installing posture or a change in an installing position in a case where the leveling is impossible. As a result, a wasteful rough leveling does not need to be performed, and hence the leveling operation can be optimized.

Further, according to the present invention, the measuring device further comprises a direction angle detection unit for detecting a relative rotation angle between the leveling unit and the measuring device main body, wherein the control unit stores a leveling state at the end of the measurement and the relative rotation angle detected by the direction angle detection unit, determines whether the leveling of the measuring device main body is possible by the leveling unit based on a detection result of the second tilt angle measuring device, the leveling state, and the relative rotation angle in a case where the measuring device is reinstalled and notifies of a change in an installing posture or a change in an installing position in a case where the leveling is impossible. As a result, the measuring device main body does not need to be corrected to a reference posture after the reinstallation, hence the leveling operation can be immediately performed, and the leveling operation can be efficiently performed.

Further, according to the present invention, in the measuring device, the first tilt angle measuring device comprises a discoid container in which a liquid forming a free liquid surface is included, a light emitting source for allowing a detection light to enter the free liquid surface, a photodetector for receiving the detection light reflected on the free liquid surface, and is configured to detect a tilt of the free liquid surface based on a detection signal from the photodetector, and wherein the container has a groove formed concentrically with a center of the container on a bottom portion and a central portion formed at the center of the container and upheaved from the groove, and wherein the liquid fills the groove and is stored so that a shallowest portion is formed at the central portion. As a result, the first tilt angle measuring device is provided with a resistance against a flow of the liquid by the shape of the bottom portion and exerts a vibration suppressing effect, hence the free liquid surface is stabilized, and a reliability of a measurement is improved.

Further, according to the present invention, in the measuring device, a plurality of flow resistance elements are provided to protrude in the groove at equal intervals, and the flow resistance elements are configured to be immersed in the liquid. As a result, the first tilt angle measuring device further exerts the vibration suppressing effect against the flow of the liquid, the free liquid surface is stabilized, the reliability of the measurement is improved, and further an undulation return suppressing effect after the tilt can be obtained.

Furthermore, according to the present invention, in the measuring device, a ring-like flow control plate for covering the groove is provided above the flow resistance elements, a plurality of cutting-off portions are formed in an inner edge of the flow control plate at equal intervals and the flow control plate is configured to be immersed in the liquid. As a result, the flow control plate prevents the vibration of the liquid and the undulation return after the tilt, the liquid surface of the liquid is stabilized against the vibration, and further a time required until the liquid is stabilized after the tilt is shortened.

DETAILED DESCRIPTION OF THE PREFERRED EMBODIMENTS

Figure 1:
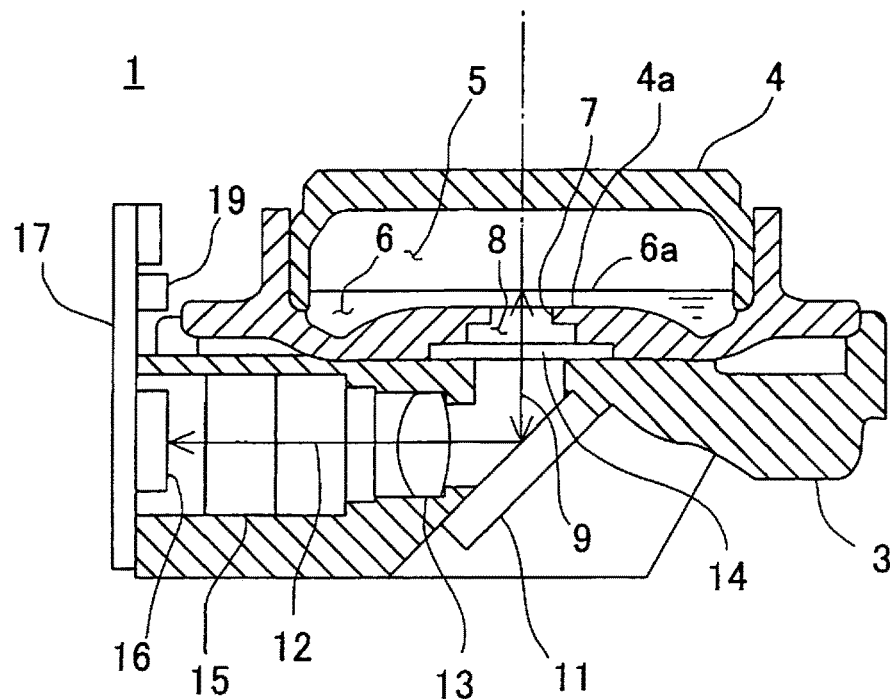
FIG. 1 is a cross-sectional view of a tilt angle measuring device according to a first embodiment of the present invention.

First, a description will be given on a tilt angle measuring device installed in a measuring device according to an embodiment of the present invention.

A description will be given on a tilt angle measuring device according to a first embodiment by referring to FIG. 1 to FIG. 4.

A tilt angle measuring device 1 detects a horizontality with high accuracy or detects a tilt angle from the horizontality, and is used as a tilt sensor. Further, a tilt angle which can be detected by the tilt angle measuring device 1 is, e.g., ±2° with respect to the horizontality.

A liquid-tight container 4 is provided on an upper surface of a support block 3. The container 4 forms a discoid space 5 therein, and a transparent liquid 6 with a predetermined viscosity is sealed in the space 5. As the liquid 6, a silicon oil or the like is used.

The space 5 has a volume which is sufficiently large with respect to an amount of the liquid sealed-in. In each of states where the tilt angle measuring device 1 is horizontal and where the tilt angle measuring device 1 tilts, the liquid 6 forms a free liquid surface 6a.

An optical path hole 7 for a detection light is provided in a bottom surface of the container 4. The optical path hole 7 has an axis concentric with a center line of the container 4, and a condenser lens 8 and a ¼ λ plate 14 are provided in the optical path hole 7. An optical axis 9 of the condenser lens 8 coincides with the axis of the optical path hole 7.

Two optical paths orthogonal to each other are formed inside the support block 3, and the two optical paths are arranged within a plane orthogonal to the optical axis 9. A reflection mirror 11 is provided at a position of an intersection of the optical axis 9 and the plane orthogonal thereto.

Figure 3:
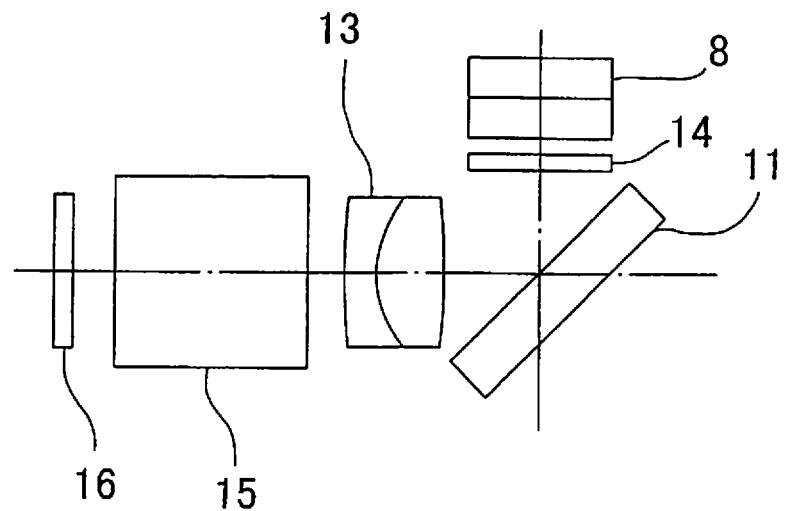
FIG. 3 is a schematic elevation diagram showing an optical system of the embodiment.

A center of one of the two optical paths is formed along a reflection optical axis 12 of the reflection mirror 11 (see FIG. 1 and FIG. 3). The condenser lens 13, a polarization beam splitter 15, and a photodetector 16 are arranged on the reflection optical axis 12 from the reflection mirror 11 side.

The polarization beam splitter 15 has a characteristic of transmitting a linearly polarized light with a predetermined polarization plane and reflecting the linearly polarized light with a polarization plane which is 90° different with respect to the linearly polarized light.

The photodetector 16 is mounted on a circuit board 17, and fixed to a side surface of the support block 3 via the circuit board 17. Further, an acceleration sensor 19 is mounted on the circuit board 17.

As the photodetector 16, a CCD, a CMOS sensor, or the like is used, and the photodetector 16 can output a signal of a light receiving position of a detection light and further an image signal based on a signal from pixels constituting the CCD or the CMOS sensor.

Figure 2:
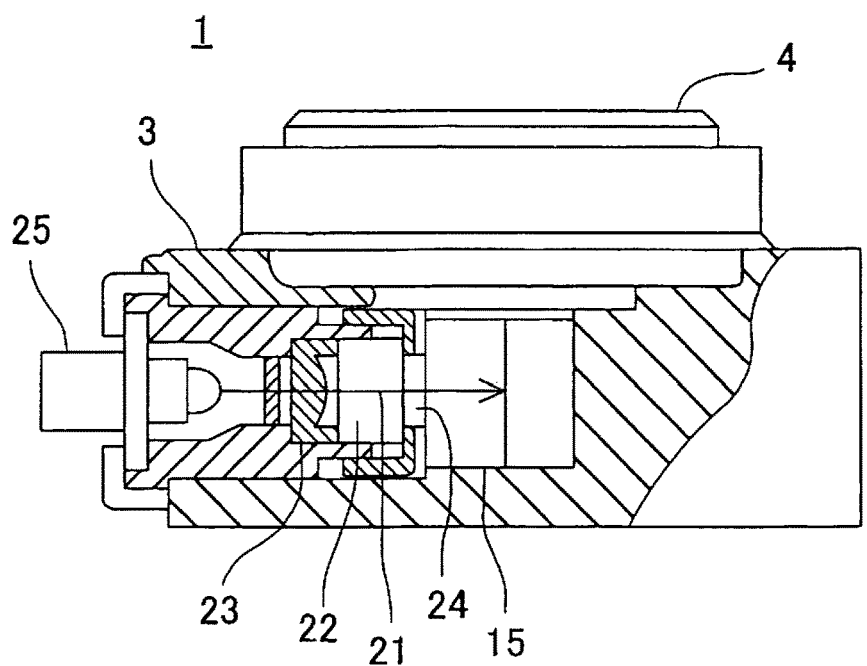
FIG. 2 is a partial cross-sectional view of the tilt angle measuring device according to the embodiment.
Figure 4:
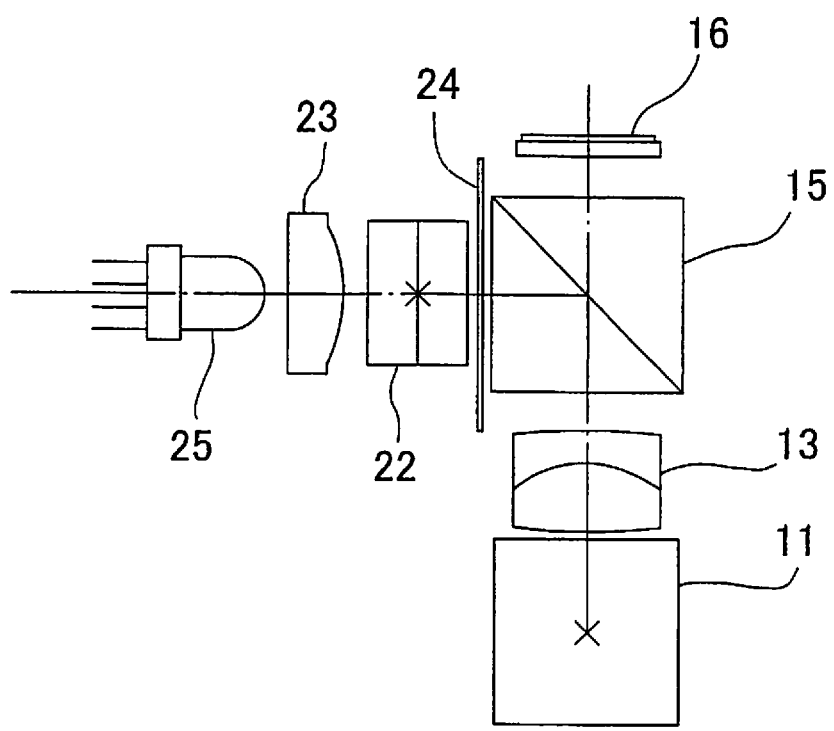
FIG. 4 is a schematic plan drawing showing the optical system of the embodiment.

The other one of the two optical paths is formed along a projection optical axis 21 (see FIG. 2 and FIG. 4). The projection optical axis 21 crosses the reflection optical axis 12, and the polarization beam splitter 15 is provided at a position where the projection optical axis 21 and the reflection optical axis 12 cross each other. Therefore, in FIG. 2, the reflection optical axis 12 extends in a vertical direction with respect to the polarization beam splitter 15 (a vertical direction with respect to a paper surface).

A polarizing plate 24, a tilt pattern 22, a collimator lens 23 and an LED light source (a light emitting source) 25 are provided on the projection optical axis 21 from the polarization beam splitter 15 side. The LED light source 25 is disposed to a side surface (a surface orthogonal to the side surface as described above) of the support block 3.

In FIG. 2, a detection light emitted from the LED light source 25 is condensed by the collimator lens 23, and transmitted through the tilt pattern 22 and the polarizing plate 24. By transmitting through the polarizing plate 24, the detection light turns to a linearly polarized light, e.g., a P linearly polarized light.

The detection light is reflected to a direction perpendicular to the paper surface by the polarization beam splitter 15, and reflected upward by the reflection mirror 11.

The detection light is transmitted through the ¼ λ plate 14, then projects a tilt pattern image to the free liquid surface 6a though the condenser lens 8, and is further reflected by the free liquid surface 6a. When the tilt angle measuring device 1 tilts, since the free liquid surface 6a maintains a horizontality, the free liquid surface 6a relatively tilts with respect to the tilt angle measuring device 1.

By a tilt of the free liquid surface 6a, the detection light is reflected at an angle by double the tilt angle according to a principle of an optical lever. A reflected detection light is transmitted through the ¼ λ plate 14, then reflected by the reflection mirror 11, transmitted through the condenser lens 13 and enters the polarization beam splitter 15. Since the detection light is transmitted through the ¼ λ plate twice, i.e., on the forward and backward paths respectively, the reflected detection light turns to a S linearly polarized light and is transmitted through the polarization beam splitter 15.

The reflected detection light transmitted through the polarization beam splitter 15 is detected by the photodetector 16. That is to say, the tilt pattern 22 is projected onto the photodetector 16.

As described above, when the free liquid surface 6a tilts, the reflected detection light is received by the photodetector 16 in a state where the reflected detection light deviates from the reflection optical axis 12. By detecting a deviation of a light receiving position with reference to a position of the reflection optical axis 12, whether or not the free liquid surface 6a is horizontal can be detected, and further a tilt angle of the free liquid surface 6a can be detected.

Further, in a case where a tilt angle is detected with high accuracy, by detecting an amount of deviation based on a displacement of an image of the tilt pattern 22, it is possible to detect an angle with high accuracy.

As described above, in the tilt angle measuring device 1, when an undulation at the time of the tilt remain on the free liquid surface 6a, or when the free liquid surface 6a vibrates, an influence of the undulation or the vibration appears on a reflecting direction of the detection light, which leads to a detection error.

In the present embodiment, the undulations or the vibration is suppressed as follows.

Figure 5A:
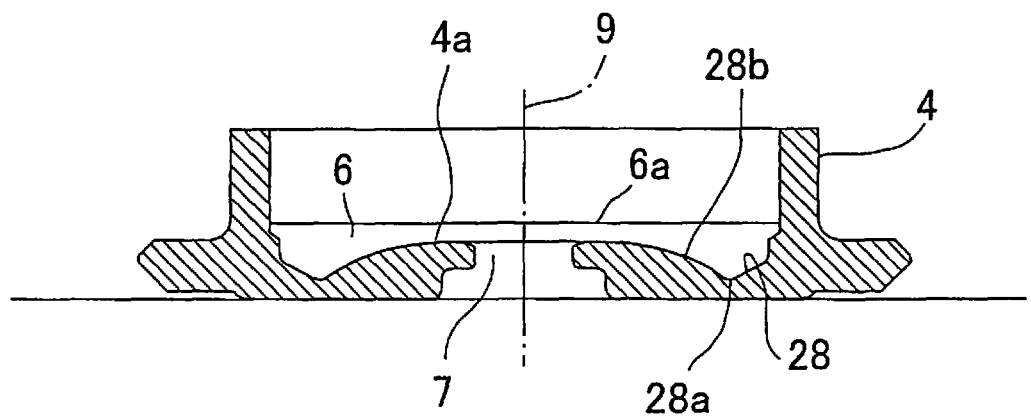
FIG. 5A is a cross-sectional view of a container of the tilt angle measuring device of the embodiment.
Figure 5B:
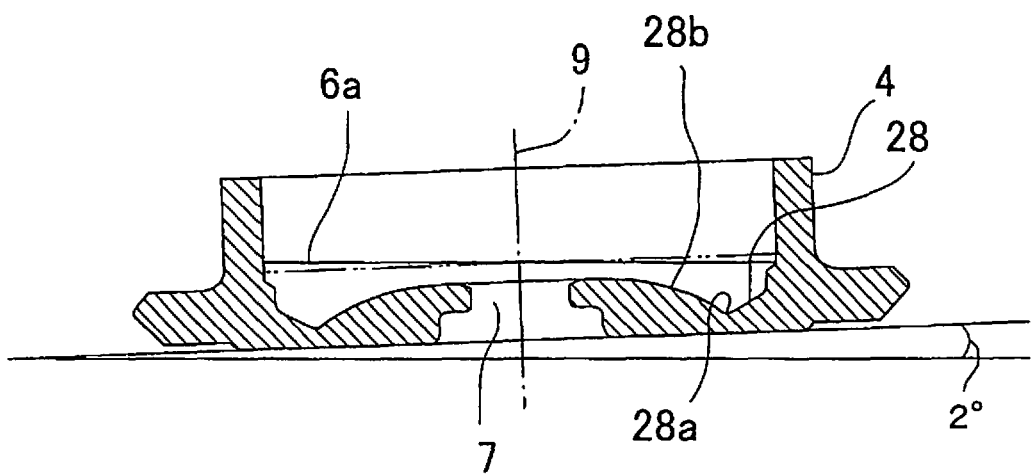
FIG. 5B is a cross-sectional view showing a state where the container tilts.

A description will be further given below on the container 4 according to the present embodiment by referring to FIG. 5A and FIG. 5B.

A ring-shaped groove 28 is formed around the optical axis 9 as the center on a bottom surface of the container 4. Further, a central portion 4a (including the optical path hole 7 portion) of the bottom surface of the container 4 is a flat surface orthogonal to the optical axis 9.

A cross-sectional shape of the groove 28 is designed as an approximately-V-like shape so that a central portion of the groove is a deepest portion 28a. A range extending from the deepest portion 28a to the central portion 4a is constituted of a curved convex surface 28b which gently upheaves from the deepest portion 28a and comes into tangent to the central portion 4a.

The liquid 6 stored in the container 4 has an amount which fills the groove 28 and further is a liquid depth as required (a shallowest portion) at the central portion 4a. Here, the liquid depth in the shallowest portion is, e.g., approximately 1 mm.

By forming the groove 28 in the container 4 and forming the central portion 4a upheaved from the groove 28, the liquid depth of a portion where the detection light enters the free liquid surface 6a can be reduced as shallow as possible.

Since the liquid depth is shallow in a reflecting portion for reflecting the detection light, a shear force due to a viscous resistance (a viscous friction) of the liquid 6 strongly acts on the free liquid surface 6a. Therefore, a micro vibration or the like is hardly transmitted to the free liquid surface 6a, and micro waves due to the vibration on the free liquid surface 6a are rarely generated. Further, since the liquid depth is shallow, large waves are hardly generated. Therefore, a stability in a stationary state is improved.

Next, a case where the tilt angle measuring device 1 tilts (FIG. 5B) will now be described, and the drawing shows a case where a right-side is raised.

When the tilt angle measuring device 1 tilts, the liquid 6 flows from right to left.

Since the sufficient liquid 6 is stored in the groove 28, even if a liquid depth of the central portion 4a is shallow, a sufficient moving amount of the liquid can be ensured. Further, the deepest portion 28a is gently continuously tangent to the central portion 4a by the curved convex surface 28b, a movement of the liquid 6 is smoothly performed. Therefore, the vibration or the like of the liquid itself due to the movement of the liquid 6 is suppressed.

Further, a flow of the liquid 6 caused by tilt moves to the groove 28 on an opposite side over the central portion 4a. Therefore, a potential energy is consumed in a process of moving over the central portion 4a.

Further, when the liquid 6 traverses the shallowest portion, the liquid 6 traverses a portion having a minimum flow passage cross-sectional area, and a flow velocity increases as compared with a case where the flow passage cross-sectional area is constant. In addition to strongly receiving the viscosity resistance and the shear force from the central portion 4a, the increase in the flow velocity leads to an increase in viscosity resistance, and a kinetic energy of the liquid 6 is consumed.

Therefore, in a case where the flow of the liquid 6 is generated due to the tilt of the tilt angle measuring device 1, a damping force strongly acts on the liquid 6. For this reason, an undulation return or the like of the liquid is suppressed, the liquid 6 is stabilized in a short time after the tilt and it becomes possible to perform a measurement.

Figure 6:
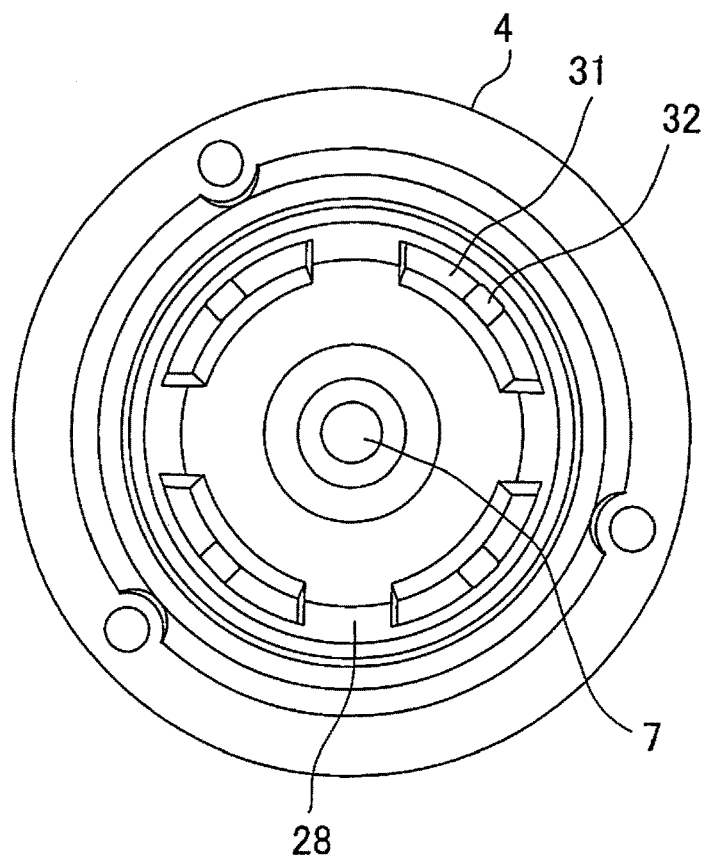
FIG. 6 is a plan view of a container of a tilt angle measuring device according to a second embodiment.
Figure 7:
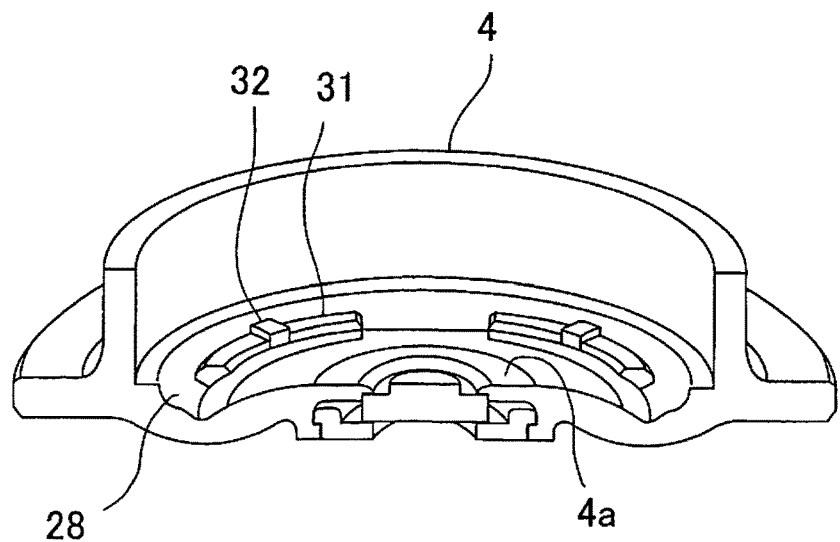
FIG. 7 is a cross-sectional perspective view of the container.

A description will be given on a second embodiment by referring to FIG. 6 and FIG. 7. Further, FIG. 6 and FIG. 7 show a container 4. It is to be noted that, in FIG. 6 and FIG. 7, what are equivalent to components as shown in FIG. 1 and FIG. 2 are referred by the same symbol.

In the second embodiment, by further generating a resistance against a flow of a liquid 6, a damping effect is increased.

In the second embodiment, flow resistance elements 31 for suppressing the smooth flow of the liquid 6 are provided in a groove 28.

Each flow resistance element 31 shown in the second embodiment has an arc shape concentric with the groove 28, and is provided to protrude at each of positions dividing a circumference into four. A cross-sectional shape of the flow resistance element 31 is an approximately pentagonal shape having the deepest position of the groove as an apex. A protuberance 32 is formed at a center of an upper surface of the flow resistance element 31. Further, the flow resistance element 31 has such a size that the flow resistance element 31 can be completely immersed in the liquid 6.

Providing the flow resistance elements 31 in the groove 28 prevents a smooth flow of the liquid 6 in the groove 28 when a container 4 vibrates. For this reason, a formation of waves caused by the vibration of the container 4 is suppressed, undulations of the liquid 6 are also suppressed and a stability of a tilting detection by a tilt angle measuring device 1 can be improved. Further, when the container 4 tilts, the flow resistance elements 31 serve as the resistance against the flow of the liquid 6, an undulation return or the like is suppressed, the liquid 6 is stabilized in a short time after the tilt, and the measurement can be performed.

It is to be noted that the shape of each flow resistance element 31 is not restricted to the above arc shape as long as the flow resistance element 31 can give the resistance against the flow of the liquid 6. For example, columnar protuberances may be provided in the groove 28 at predetermined intervals.

Figure 8:
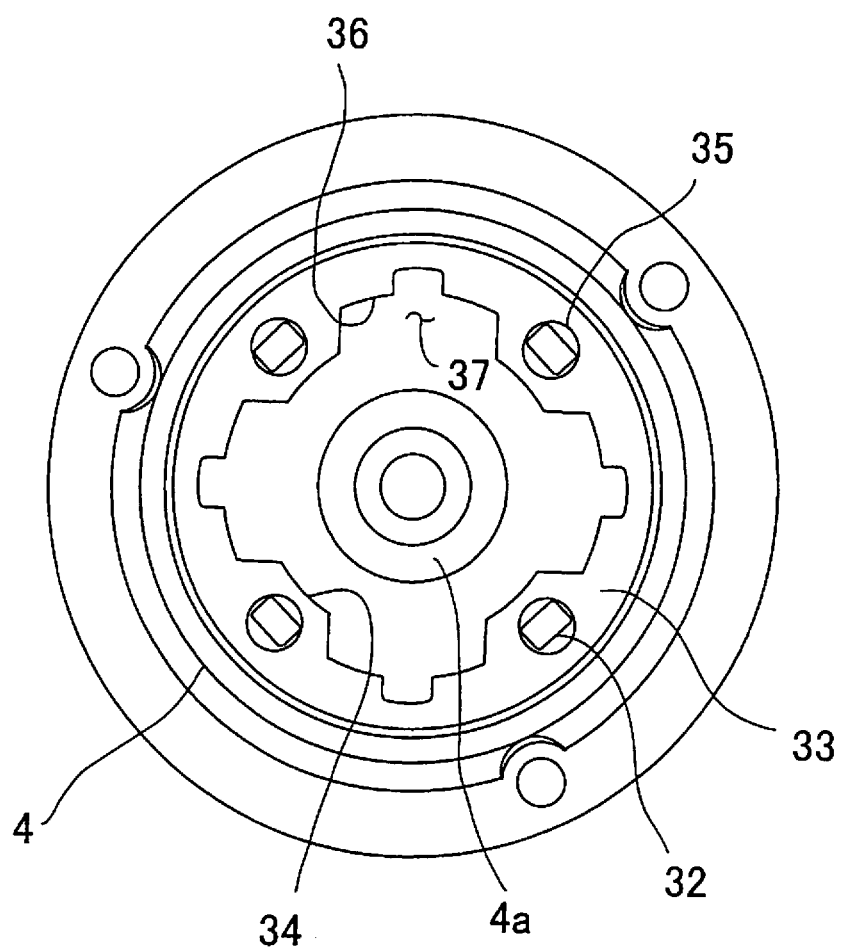
FIG. 8 is a plan view of a container of a tilt angle measuring device according to a third embodiment having a flow control plate disposed thereto.
Figure 9:
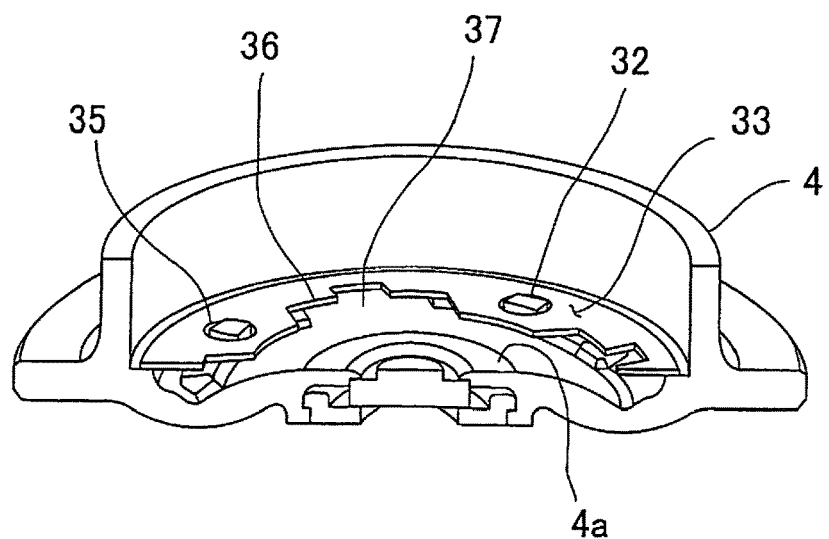
FIG. 9 is a cross-sectional perspective view of the container having the flow control plate disposed thereto.

FIG. 8 and FIG. 9 show a third embodiment.

In the third embodiment, a flow control plate 33 is provided so as to cover a groove 28.

The flow control plate 33 has a circular hole 34 in a central portion, and is designed as a ring shape as an overall shape. Fitting holes 35 corresponding to protuberances 32 are provide in the flow control plate 33 at four positions (the positions equally dividing a circumference into four), and the flow control plate 33 is disposed in a state where the fitting holes 35 are fitted into the protuberances 32.

In a state where the flow control plate 33 is disposed, the flow control plate 33 is completely immersed in a liquid 6. Further, even in a state where a tilt angle measuring device 1 tilts, the flow control plate 33 is adapted not to be exposed.

In the flow control plate 33, a cutting-off portion 36 of a convex shape with a small projection is formed between the fitting holes 35 and 35 (the positions equally dividing a circumference into four) from an inner edge side, respectively. In a state where the flow control plate 33 is disposed, the cutting-off portion 36 forms a gap 37, into or from which the liquid 6 flows, between the cutting-off portion 36 and a central portion 4a.

When the flow control plate 33 is provided, a liquid shallow portion is formed all over an inside of a container 4, and the waves are prevented from being generated on a surface of the liquid 6. Further, in a case where the tilt angle measuring device 1 tilts, since the liquid 6 flows through the gap 37, the flow resistance is large, and a damping effect is exerted. It is to be noted that the flow control plate 33 itself has the damping effect, thus the flow resistance elements 31 may be omitted, and the flow control plate 33 alone may be provided.

Figure 10:
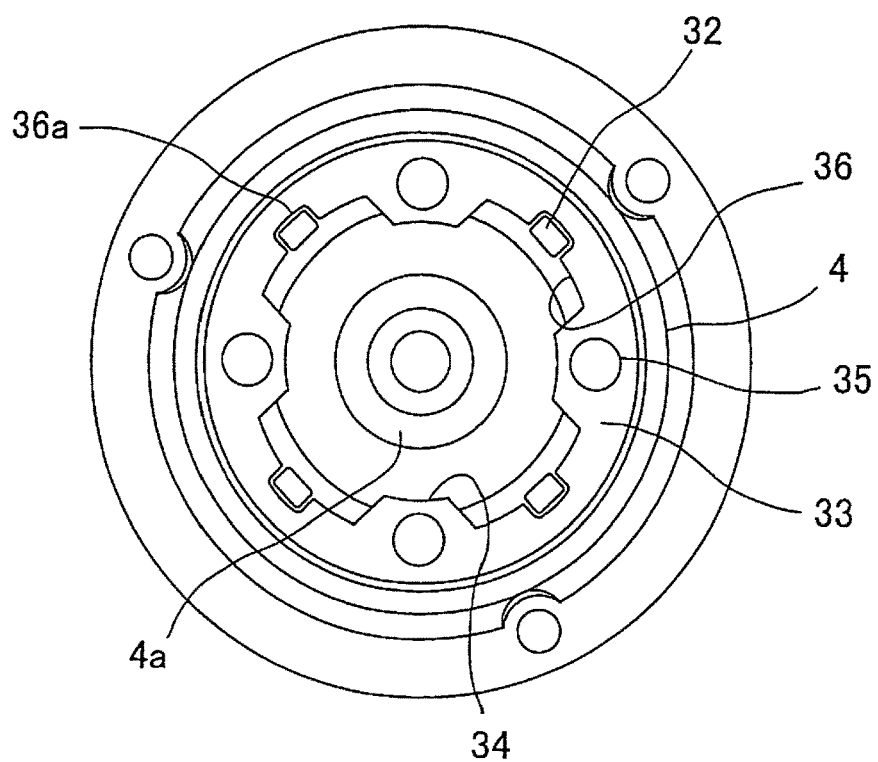
FIG. 10 is a plan view of the container according to a variation example of the third embodiment having the flow control plate disposed thereto.

FIG. 10 shows a variation example of the third embodiment.

In the variation example, small projections 36a of cutting-off portions 36 formed in a flow control plate 33 are capable of fitting into protuberances 32, and the flow control plate 33 is provided in rotating at a necessary angle (45° in the drawing) with respect to the third embodiment.

When the small projections 36a are fitted into the protuberances 32, flow resistance elements 31 are positioned at the positions of the cutting-off portions 36, and a substantial aperture area of a gap 37 is reduced. Therefore, the flow resistance further increases, and the damping effect also increases. Further, since fitting holes 35 are fully opened and a liquid 6 flows into or from the fitting holes 35, the inflow/outflow is dispersed, and a flow state of the liquid 6 is averaged.

As described above, in the present embodiment, since the damping effect is considerable, the liquid 6 with a low viscosity can be used. Using the liquid 6 with the low viscosity leads to an improvement in followability, and a working efficiency of a leveling operation in a measurement apparatus using the tilt angle measuring device 1 can be improved.

A viscosity of a liquid 6 used in a conventional tilt sensors is 100 cSt but, in the present embodiment, a liquid 6 with a viscosity of 50 cSt can be used.

Furthermore, since a liquid 6 with the low viscosity can be used, an efficient use in a cold region of a high latitude becomes possible.

Figures 11, 12:
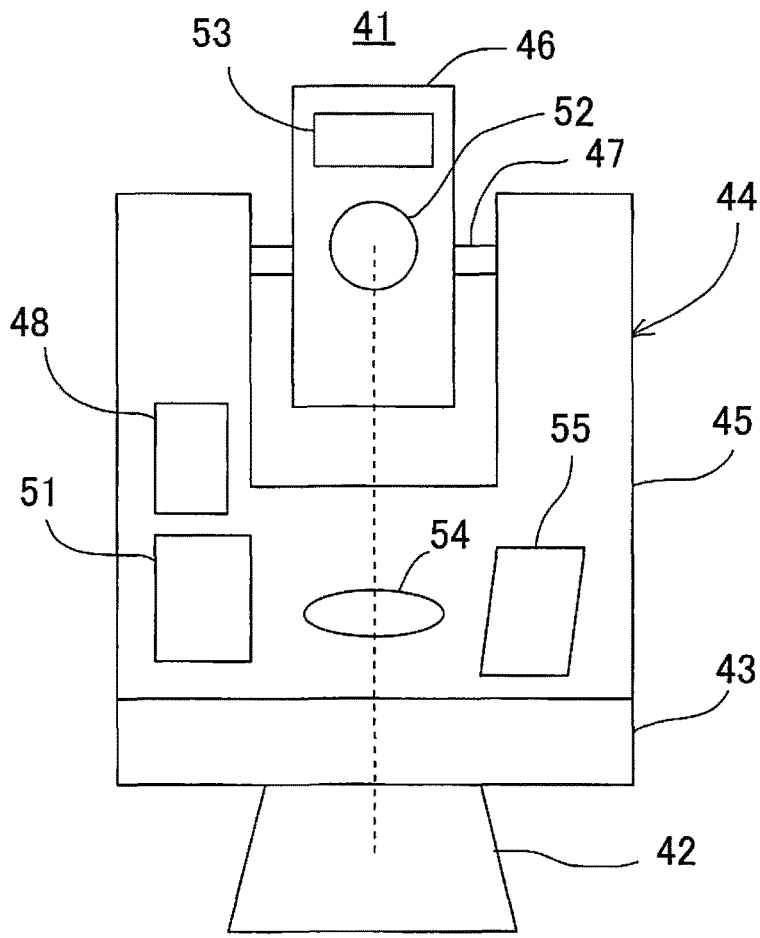
FIG. 11 is a drawing showing damping characteristics under a vibration environment in the present embodiment.
FIG. 12 is a cross-sectional view of a measuring device according to an embodiment of the present invention.

FIG. 11 shows a vibration suppressing effect corresponding to the second embodiment and the third embodiment as described above under a vibration environment. It is to be noted that FIG. 11 shows cases where a silicon oil of 50 cSt was used in the second embodiment and the third embodiment and a silicon coil of 100 cSt was used in a conventional tilt sensor.

In FIG. 11, each storage time shows a time for which a photodetection signal is taken from a photodetector 16 (an exposure time), and each error rate shows an error incidence rate (a tilt pattern reading error incidence rate which has occurred during the storage time) under a vibration environment. Here, the conventional tilt sensor means that a bottom of a liquid storage container is flat.

As shown in FIG. 11, in the conventional tilt sensor, a storage time is set to 30 ms from a damping state of the liquid 6 (the viscosity: 100 cSt), and the error incidence rate is 27% at this storage time under a vibration environment.

On the other hand, although the viscosity of the liquid 6 is decreased to 50 cSt, in the second embodiment and the third embodiment, the error incidence rates are 25% and 24% under the vibration environment at the storage time 42 ms. If the storage time is 40 ms or less, the second embodiment and the third embodiment have the error incidence rates lower than the error incident rate of the conventional tilt sensor and can produce excellent results against the vibration.

Therefore, the viscosity of the liquid 6 can be reduced, and an excellent effect which provides a high responsiveness of a tilt angle measuring device 1 even under a low-temperature environment is exerted.

Figure 13:
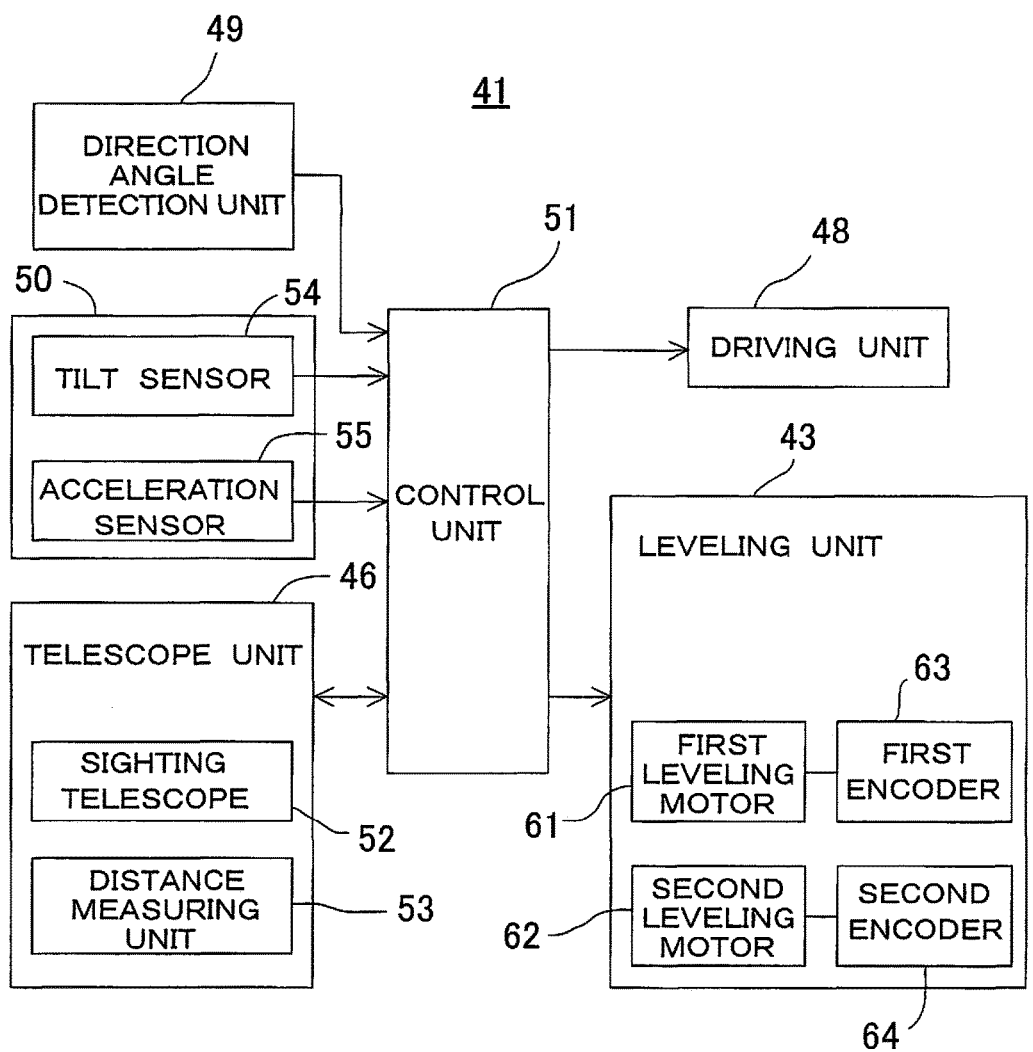
FIG. 13 is a control block diagram of the measuring device.

FIG. 12 and FIG. 13 show a measuring device 41 according to the present embodiment having the tilt angle measuring device 1 as described above. Further, FIG. 12 shows a total station as an example of the measuring device.

In FIG. 12, a reference numeral 42 denotes a measuring device support unit such as a tripod, and a reference numeral 43 denotes a leveling unit.

A measuring device main body 44 is provided on the support unit 42 via the leveling unit 43. The measuring device main body 44 can rotate around a vertical axis as the center with respect to the leveling unit 43.

The measuring device main body 44 mainly includes a frame unit 45 and a telescope unit 46. The telescope unit 46 is provided in the frame unit 45 via a horizontal shaft 47, and the telescope unit 46 is capable of all-round rotation via the horizontal shaft 47.

Inside the frame unit 45, there are provided a driving unit 48 constituted of a horizontal rotation driving unit for horizontally rotating the measuring device 41 and a vertical direction driving unit for rotating and driving the telescope unit 46 in a vertical direction, or the like, a direction angle detection unit 49 for detecting a horizontal angle and a vertical angle, and a tilt angle measuring device 50 for detecting a tilt angle with respect to a horizontality of the measuring device main body 44.

Further, a control unit 51 is provided inside the frame unit 45. The control unit 51 processes a signal from the tilt angle measuring device 50 and controls the leveling unit 43, the driving unit 48 and a distance measuring unit 53 (to be described later), or the like.

The telescope unit 46 has a sighting telescope 52 and the distance measuring unit 53. The distance measuring unit 53 is configured to project a distance measuring light to an object to be measured through the sighting telescope 52, receive a reflected light from the object to be measured and perform a distance measurement based on a detection result of the reflected light.

The tilt angle measuring device 50 includes a tilt sensor 54 (which is shown as a tilt angle measuring device 1 in FIG. 1) as a first tilt angle measuring device for detecting a horizontality with high accuracy, and an acceleration sensor 55 (which is shown as an acceleration sensor 19 in FIG. 1) as a second tilt angle measuring device for detecting a tilt angle in a wide range and for detecting a tilt in three axial directions with a high responsiveness.

Figure 14A:
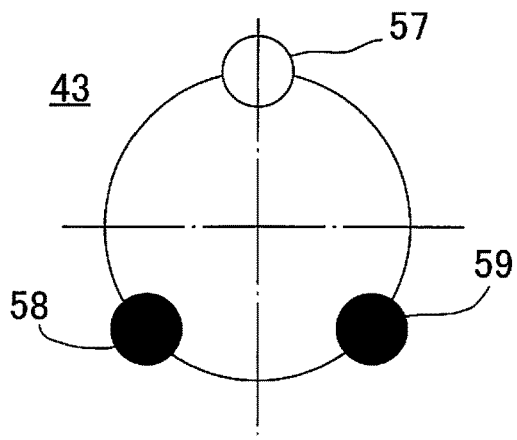
FIG. 14A is a schematic view of a leveling unit.
Figure 14B:
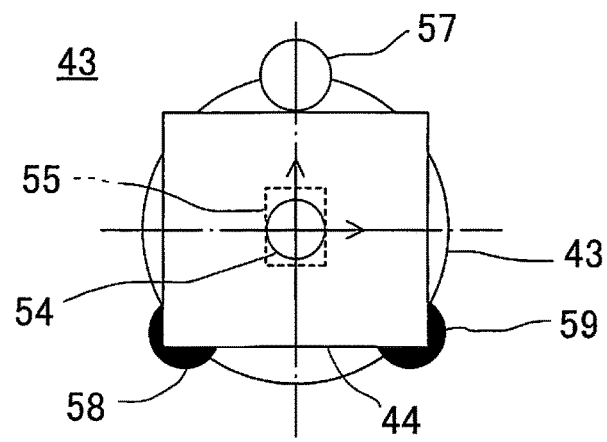
FIG. 14B is a schematic view showing a relationship between a leveling unit and a measuring device main body.

FIG. 14 shows an approximate arrangement of the leveling unit 43.

In the leveling unit 43, a reference shaft 57, a first leveling shaft 58 and a second leveling shaft 59 are provided in such a manner that a reference shaft 57, a first leveling shaft 58 and a second leveling shaft 59 are placed at vertexes of a triangle, and the measuring device main body 44 can freely tilt in an arbitrary direction with the reference shaft 57 as the center. The first leveling shaft 58 and the second leveling shaft 59 are rotated by a first leveling motor 61 and a second leveling motor 62 (see FIG. 13) respectively and a height is adjusted. Thereby, the measuring device main body 44 can tilt in an arbitrary direction. The first and second encoders 63 and 64 (see FIG. 13) are attached to the first and the second leveling motors 61 and 62 respectively, and a number of rotations (a height adjustment amount) is monitored as an encoder pulse number by the control unit 51.

The control unit 51 controls the leveling unit 43 based on the detection results of the tilt sensor 54 and the acceleration sensor 55, and performs an automatic leveling of the measuring device main body 44.

It is to be noted that, as described later, a detection result of the acceleration sensor 55 is used in a case where a rough leveling (an example: the leveling to narrow down to ±10' or less) is performed, and a detection result of the tilt sensor 54 is used in a case where a precise leveling (an example: the leveling to narrow down to ±30" or less) is performed.

The measuring device 41 may stop a power supply to the tilt sensor 54 in a case where the rough leveling is performed (a state where the acceleration sensor 55 is operative), and the measuring device 41 may stop the power supply to the acceleration sensor 55 in a case where the precise leveling is performed (a state where the tilt sensor 54 is operative). By alternatively supplying the electric power to the tilt sensor 54 and the acceleration sensor 55, the electric power can be saved.

It is to be noted that an inertial measurement unit (IMU) may be used as the second tilt angle measuring device.

A description will be given below on an automatic leveling by referring to FIG. 14A to FIG. 14C and FIG. 15.

The measuring device 41 is installed at a predetermined position. After the installation, a leveling is started.

It is to be noted that, in the first leveling, the measuring device main body 44 is assumed to face in a reference direction with respect to the leveling unit 43. That is to say, a reference direction of the leveling unit 43 coincides with a reference direction of the measuring device main body 44.

(Step 01) A tilting direction and a rough tilt angle of the measuring device main body 44 are detected by the acceleration sensor 55.

(Step 02) A detection result is input to the control unit 51, and it is judged whether or not a rough detection angle is within a leveling range provided by the leveling unit 43. A range in which the leveling shafts can be mechanically driven is a range in which the leveling motors can rotate and also a range which is managed by the encoder pulses of a motor unit. It is possible to recognize current positions of the leveling shafts from the pulse count numbers of the first and second encoders 63 and 64, and a difference from an upper limit or a lower limit is a drivable range. When the control unit 51 has correlation data of the "pulse count numbers" and a "tilt angle", whether the rough detection angle is within the leveling range provided by the leveling unit 43 is judged.

(Step 10) In a case where the rough detection angle exceeds the leveling range provided by the leveling unit 43, the control unit 51 produces an alarm signal, and notifies that an installing posture of the measuring device 41 is inappropriate and the posture is urged to be changed by adjusting the support unit 42. Alternatively, the control unit 51 notifies that a reinstallation, e.g., a change in installing place is required.

(Step 03) Further, it is judged whether the detection result is within a precise detection range provided by the tilt sensor 54, i.e., whether a detection range where the photodetector 16 is capable of detecting a detection light.

In a case where a rough tilt angle is within the precise detection range of the tilt sensor 54, Step 06 and subsequent steps are executed and in a case where the rough tilt angle is out of the precise detection range of the tilt sensor 54, Step 04 and subsequent steps are executed.

(Step 04) Further, in a case where the rough detection angle is within the leveling range provided by the leveling unit 43, which one of the first leveling shaft 58 and the second leveling shaft 59 is to be adjusted is judged based on the detected tilting direction. Based on the judgement, the control unit 51 drives and controls the leveling unit 43, rotates the leveling shaft to be adjusted by the first leveling motor 61 or the second leveling motor 62 while monitoring a count number of the encoder pulse, and performs a rough leveling.

(Step 05) A tilt angle detection is performed by the acceleration sensor 55, and whether the rough leveling has been completed is judged. The completion of the rough leveling is judged based on whether a detection result from the acceleration sensor 55 has reached the detection range (the precise detection range) of the tilt sensor 54.

(Step 06) When the detection result is judged to be within the precise detection range, the control unit 51 finely adjusts the first leveling shaft 58 or the second leveling shaft 59 by the first leveling motor 61 or the second leveling motor 62 based on a signal from the tilt sensor 54, and performs the precise leveling.

(Step 07) Based on a detection result of the tilt sensor 54, whether the horizontality has been achieved is detected.

(Step 08) When the precise leveling is completed based on the detection result from the tilt sensor 54, the automatic leveling is completed. The control unit 51 performs, e.g., giving off an alarm sound or a flashing display and notifies an operator of the completion of the automatic leveling.

Next, a description will be given on a case where, after a completion of a predetermined measurement, the installing position of the measurement device 41 is changed and a measurement continues.

Figure 14C:
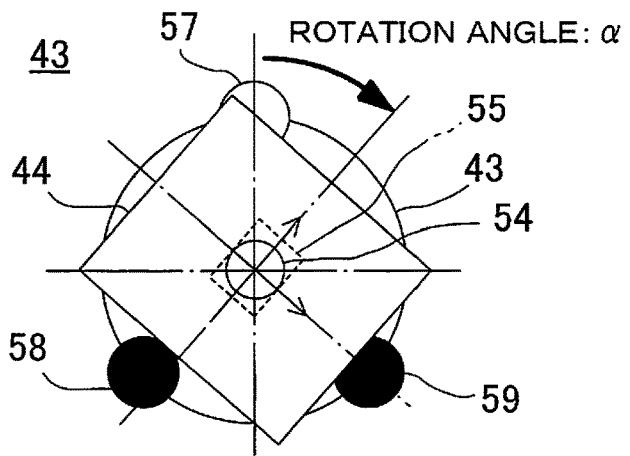
FIG. 14C is a schematic view showing a state where the measuring device main body rotates with respect to a leveling unit.
Figure 15:
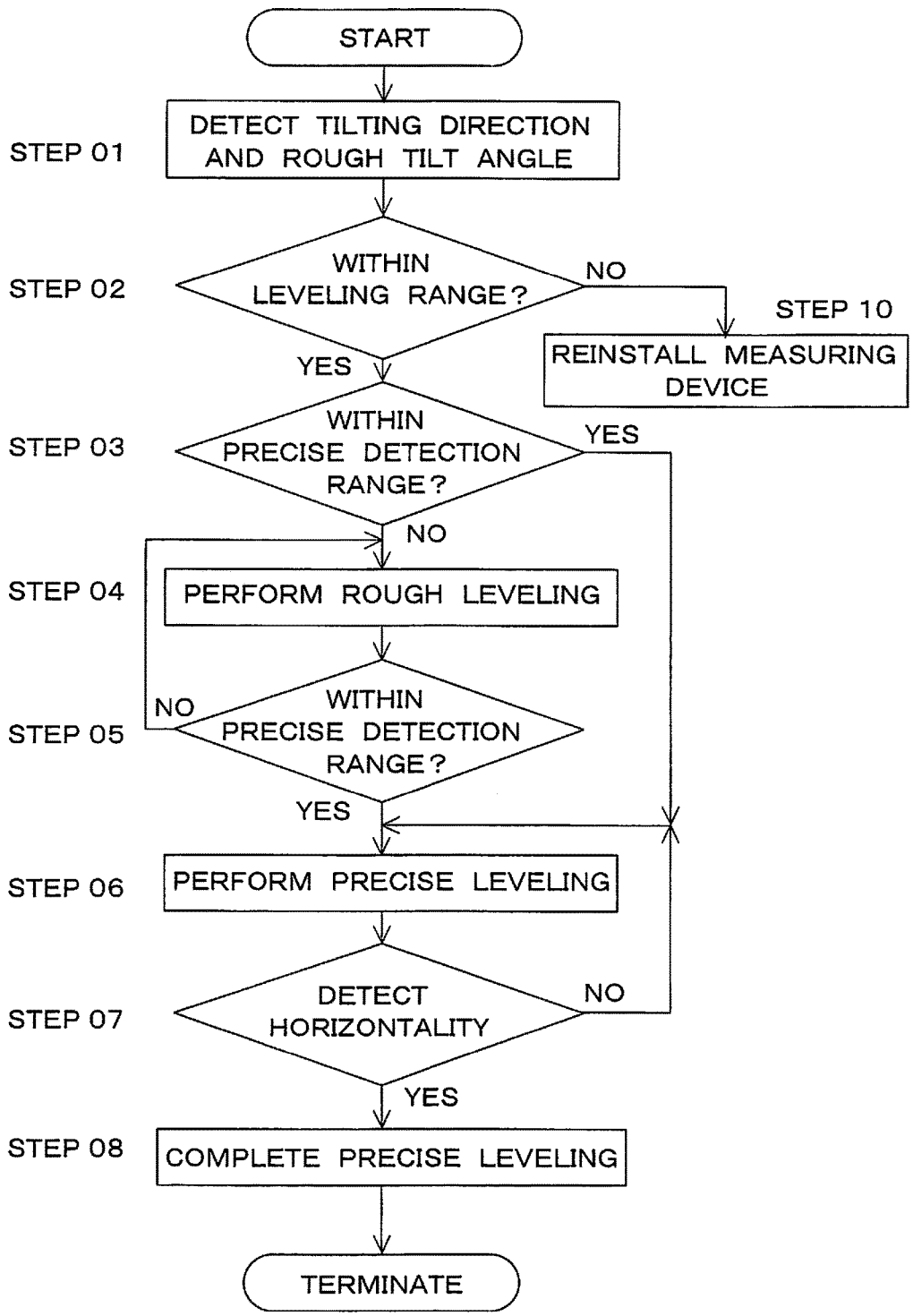
FIG. 15 is a flowchart of an automatic leveling of a measuring device according to the present embodiment.

Usually, in a state where a planned measurement is completed, as shown in FIG. 14C, the measuring device main body 44 rotates at an angle α with respect to the leveling unit 43. Therefore, in a case where the rough leveling is performed based on a detection result of the acceleration sensor 55, judgment that which of the first leveling shaft 58 and the second leveling shaft 59 is to be adjusted must take the rotation angle α into consideration.

A rotation angle of the measuring device main body 44 with respect to the leveling unit 43 is detected by the direction angle detection unit 49. That is to say, a horizontal rotation angle detected by the direction angle detection unit 49 at the time of the completion of the previous measurement is stored.

The control unit 51 judges which of the first leveling shaft 58 and the second leveling shaft 59 is to be adjusted based on the stored rotation angle, and the tilt angle and the tilting direction of the measuring device main body 44 detected by the acceleration sensor 55.

Further, based on a judgment result, the leveling unit 43 is controlled and driven, and the leveling is performed. It is to be noted that the leveling operation is the same as the leveling operation from Step 04 to Step 08.

In the automatic leveling as described above, first, since whether or not the measuring device 41 can be leveled is judged based on a detection result of the acceleration sensor 55, in a case where an installing position is not appropriate, the reinstallation can be immediately performed. Therefore, as compared with a case where the leveling is judged to be impossible as a result of performing the leveling operation, a leveling time can be substantially shortened.

Further, since the leveling is performed based on the detection result of the acceleration sensor 55 with the high responsiveness until reaching the range capable of performing the precise leveling, a leveling state can be judged in a real time, and a leveling time, until reaching the range capable of performing the precise leveling, is substantially reduced.

Further, even in a case where the measuring device 41 is reinstalled, the measuring device main body 44 does not need to be reset to a reference position with respect to the leveling unit 43, the automatic leveling can be immediately performed, an excellent workability is provided, and further the leveling time is shortened.

Furthermore, since the tilt angle measuring device 1 has the good responsiveness, a survey work using the measuring device 41 in a cold area can be efficiently performed.

Since the tilt angle measuring device 1 includes a second tilt angle measuring device (an acceleration sensor 55 in the embodiment as described above), functions as described below can be exerted.

In a case where the tilt angle measuring device 1 is portable, in a case where the tilt angle measuring device 1 is moved in a state where a power supply is ON, a detection signal from the acceleration sensor 55 can be constantly monitored, and a safety lock for preventing a miss operation while moving is enabled.

Further, the acceleration sensor 55 is constantly operated, detection data of the acceleration sensor 55 is constantly monitored, abnormality data above a certain level is stored as monitoring data in association with detection date and a detection time. At the time of a maintenance or a repair of a measuring device, the monitoring data is confirmed, a maintenance item can be accurately selected, or a part which needs to be repaired or an inspection item can be accurately designated.

The invention claimed is:

1. A measuring device comprising; a leveling unit, a measuring device main body provided on said leveling unit, a control unit, a first tilt angle measuring device for detecting a horizontality with high accuracy, and a second tilt angle measuring device for detecting a tilt angle in a wider range than a range of said first tilt angle measuring device and having a higher responsiveness than a responsiveness of said first tilt angle measuring device, wherein said control unit, said first tilt angle measuring device and said second tilt angle measuring device are provided in said measuring device main body and wherein said control unit drives said leveling unit based on a detection result of said second tilt angle measuring device, performs a rough leveling until a tilt angle detected by said second tilt angle measuring device reaches within a range in which said first tilt angle measuring device is capable of detecting and levels said measuring device main body horizontally based on a detection result of said first tilt angle measuring device.

2. The measuring device according to claim 1, wherein said control unit determines whether said measuring device main body is capable of being leveled by said leveling unit based on a detection result of said second tilt angle measuring device at the time of installing said measuring device, and notifies of a change in an installing posture or a change in an installing position in a case where the leveling is impossible.

3. The measuring device according to claim 1, further comprising a direction angle detection unit for detecting a relative rotation angle between said leveling unit and said measuring device main body, wherein said control unit stores a leveling state at the end of the measurement and said relative rotation angle detected by said direction angle detection unit, determines whether the leveling of said measuring device main body is possible by said leveling unit based on a detection result of said second tilt angle measuring device, said leveling state, and said relative rotation angle in a case where said measuring device is reinstalled and notifies of a change in an installing posture or a change in an installing position in a case where the leveling is impossible.

4. The measuring device according to claim 1, wherein said first tilt angle measuring device comprises a discoid container in which a liquid forming a free liquid surface is included, a light emitting source for allowing a detection light to enter said free liquid surface, a photodetector for receiving the detection light reflected on said free liquid surface, and is configured to detect a tilt of said free liquid surface based on a detection signal from said photodetector, and wherein said container has a groove formed concentrically with a center of said container on a bottom portion and a central portion formed at the center of said container and upheaved from said groove, and wherein said liquid fills said groove and is stored so that a shallowest portion is formed at said central portion.

5. The measuring device according to claim 4, wherein a plurality of flow resistance elements are provided to protrude in said groove at equal intervals, and said flow resistance elements are configured to be immersed in said liquid.

6. The measuring device according to claim 5, wherein each of said flow resistance elements has an arc shape and a flat upper surface.

7. The measuring device according to claim 5, wherein a ring-like flow control plate for covering said groove is provided above said flow resistance elements, a plurality of cutting-off portions are formed in an inner edge of said flow control plate at equal intervals and said flow control plate is configured to be immersed in said liquid.

8. The measuring device according to claim 6, wherein a ring-like flow control plate for covering said groove is provided above said flow resistance elements, a plurality of cutting-off portions are formed in an inner edge of said flow control plate at equal intervals and said flow control plate is configured to be immersed in said liquid.

* * * * *